(12) United States Patent
Suyama (10) Patent No.: US 10,631,185 B2
(45) Date of Patent: Apr. 21, 2020

(54) INFORMATION PROCESSING APPARATUS, WIRELESS NETWORK COMMUNICATION SYSTEM, WIRELESS COMMUNICATION RELAY APPARATUS, AND INFORMATION PROCESSING METHOD

(71) Applicant: Yamaha Corporation, Hamamatsu-shi, Shizuoka-Ken (JP)

(72) Inventor: Akihiko Suyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 151 days.

(21) Appl. No.: 15/900,196

(22) Filed: Feb. 20, 2018

(65) Prior Publication Data

US 2018/0176808 A1  Jun. 21, 2018

Related U.S. Application Data

(63) Continuation of application No. PCT/JP2016/086850, filed on Dec. 12, 2016.

(30) Foreign Application Priority Data

Dec. 14, 2015  (JP) .................................. 2015-242796

(51) Int. Cl.
*H04W 24/08* (2009.01)
*G06F 3/14* (2006.01)
(Continued)

(52) U.S. Cl.
CPC .............. *H04W 24/08* (2013.01); *G06F 3/14* (2013.01); *G06F 3/1454* (2013.01); *H04B 7/15* (2013.01);
(Continued)

(58) Field of Classification Search
CPC ... H04W 24/08; H04W 72/08; H04W 72/085; H04B 7/15; G06F 3/1454; G06F 3/14
See application file for complete search history.

(56) References Cited

U.S. PATENT DOCUMENTS

2001/0049641 A1* 12/2001 Nakamura ............. G06Q 30/02
455/556.1
2002/0127993 A1*  9/2002 Zappala ................ H04W 24/08
455/404.2
(Continued)

FOREIGN PATENT DOCUMENTS

JP  2003-258710 A  9/2003
JP  2008-98736 A  4/2008
(Continued)

OTHER PUBLICATIONS

Extended European Search Report issued in counterpart European Application No. 16875570.0 dated Jun. 13, 2019 (nine (9) pages).
(Continued)

*Primary Examiner* — Kyaw Z Soe
(74) *Attorney, Agent, or Firm* — Crowell & Moring LLP (57) ABSTRACT

An information processing apparatus includes a wireless communicator performing wireless communication, at least one processor configured to implement stored instructions and execute a measure task that transmits a predetermined command to a predetermined apparatus through the wireless communicator and measuring a response time, and a display displaying the response time.

20 Claims, 9 Drawing Sheets

(51) Int. Cl.
  *H04B 7/15*    (2006.01)
  *H04W 72/08*   (2009.01)
  *H04B 17/364*  (2015.01)
  *H04W 84/12*   (2009.01)

(52) U.S. Cl.
  CPC .... H04W 72/085 (2013.01); *G09G 2370/042* (2013.01); *G09G 2370/10* (2013.01); *G09G 2370/16* (2013.01); *H04B 17/364* (2015.01); *H04W 84/12* (2013.01)

(56) References Cited

U.S. PATENT DOCUMENTS

| | | | | |
|---|---|---|---|---|
| 2004/0263424 | A1* | 12/2004 | Okuley | G06F 3/1446 345/1.1 |
| 2007/0233694 | A1* | 10/2007 | Baxter | H04L 29/06027 |
| 2008/0084823 | A1 | 4/2008 | Akasaka et al. | |
| 2009/0011709 | A1 | 1/2009 | Akasaka et al. | |
| 2010/0190503 | A1* | 7/2010 | Chiang | H04N 5/23206 455/450 |
| 2017/0244472 | A1* | 8/2017 | Saito | H04B 17/318 |

FOREIGN PATENT DOCUMENTS

| | | |
|---|---|---|
| JP | 2009-15551 A | 1/2009 |
| JP | 2015-122604 A | 7/2015 |
| JP | 2016-139891 A | 8/2016 |

OTHER PUBLICATIONS

Japanese-language Office Action issued in counterpart Japanese Application No. 2015-242796 dated Sep. 5, 2018 with unverified English translation (eight pages).

International Search Report (PCT/ISA/210) issued in PCT Application No. PCT/JP2016/086850 dated Feb. 28, 2017 with English translation (five pages).

Japanese-language Written Opinion (PCT/ISA/237) issued in PCT Application No. PCT/JP2016/086850 dated Feb. 28, 2017 (four pages).

* cited by examiner

| HEADER | BODY |

Wireless

SSID
YH-11569

Wi-Fi Strength
100(0.049)

Wireless

SSID
YH-11569

Wi-Fi Strength
100(1.300)

INFORMATION PROCESSING APPARATUS, WIRELESS NETWORK COMMUNICATION SYSTEM, WIRELESS COMMUNICATION RELAY APPARATUS, AND INFORMATION PROCESSING METHOD

CROSS REFERENCE TO RELATED APPLICATIONS

The present application is a continuation application of International Patent Application No. PCT/JP2016/086850, filed on Dec. 12, 2016, which claims priority to Japanese Patent Application No. 2015-242796, filed on Dec. 14, 2015. The contents of these applications are incorporated herein by reference in their entirety.

BACKGROUND OF THE INVENTION

1. Field of the Invention

A preferred embodiment of the present invention relates to an information processing apparatus that performs a predetermined process in network communication.

2. Description of the Related Art

In information processing apparatuses such as a smartphone, Wi-Fi strength has been displayed in network communication such as via wireless LAN (see Japanese Unexamined Patent Application Publication No. 2015-122604, for example). Accordingly, a user is able to grasp a communication state.

In addition, the information processing apparatuses measure actual transmission speed by transmitting and receiving test data to and from other apparatuses.

However, the Wi-Fi strength does not necessarily reflect an actual communication state. For example, in a case in which a noise source is present nearby or a large number of users are present, the communication state is not good in many cases even though the Wi-Fi strength is strong.

In addition, in order to measure transmission speed, transmission and reception of test data of a certain amount of capacity are required. Therefore, a certain amount of time is required until a result is obtained.

SUMMARY OF THE INVENTION

In view of the foregoing, a preferred embodiment of the present invention provides an information processing apparatus, a wireless network communication system, a wireless communication relay apparatus, and an information processing method that are able to immediately obtain an index that reflects an actual communication state.

An information processing apparatus according to a preferred embodiment of the present invention includes a wireless communicator performing wireless communication, at least one processor configured to implement stored instructions and execute a measure task that transmits a predetermined command to a predetermined apparatus through the wireless communicator and measures a response time, and a display displaying the response time.

According to a preferred embodiment of the present invention, an index that reflects an actual communication state is able to be obtained immediately.

The above and other elements, features, characteristics, and advantages of the present invention will become more apparent from the following detailed description of the preferred embodiments with reference to the attached drawings.

DETAILED DESCRIPTION OF THE PREFERRED EMBODIMENTS

An information processing apparatus according to a preferred embodiment of the present invention, as described above, includes a wireless communicator performing wireless communication, at least one processor configured to implement stored instructions and execute a measure task that transmits a predetermined command to a predetermined apparatus through the wireless communicator and measures a response time, and a display displaying the response time.

When a communication state is good, the response time is short, while, when a communication state is bad, the response time is long. Therefore, the information processing apparatus, by transmitting a predetermined command (test data) and measuring a response time, displays the response time as an index that reflects an actual communication state.

In addition, a conventional information processing apparatus, by displaying the Wi-Fi strength between an own apparatus and a relay apparatus such as a wireless access point, has presented a communication state, and, in such a case, is not able to grasp the communication state of a predetermined apparatus connected through the relay apparatus. However, the information processing apparatus of the present invention, by measuring a response time from a predetermined apparatus, is able to grasp the communication state in the predetermined apparatus.

It is to be noted that the measuring task further transmits a second predetermined command to a relay apparatus and measures a second response speed that indicates a response speed and the display displays the response time obtained by subtracting the second response speed and is thus able to appropriately grasp only the communication state of the predetermined apparatus.

In addition, the information processing apparatus may display information with respect to Wi-Fi strength, together with a response time. In such a case, the information processing apparatus obtains the information with respect to the Wi-Fi strength in the predetermined apparatus.

In addition, the measuring task, as the response time, may calculate an average value of a plurality of time of measurements. Further, the information processing apparatus includes a receiving portion receiving an operation of a user, and the measuring task, when receiving a reset instruction from the user, calculates an average value by using next and subsequent measurement results.

In addition, the response time may be displayed as index information in a plurality of stages (such as "good," "normal," and "bad," for example).

Figure 1:
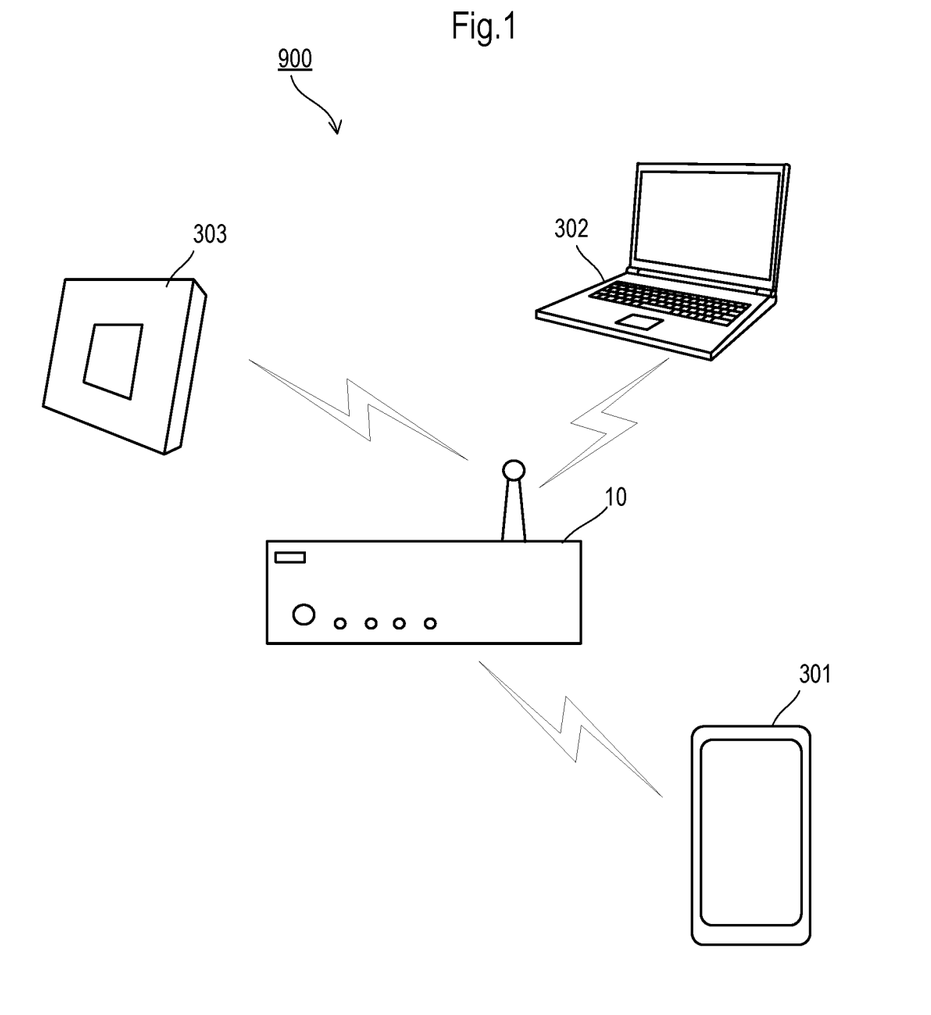
FIG. 1 is a diagram illustrating an overview of a wireless network communication system.

Hereinafter, a description is made of a specific configuration. FIG. 1 is a diagram illustrating an overview of a wireless network communication system 900. The wireless network communication system 900 is provided with a wireless access point (AP) 10 being a relay apparatus, a smartphone 301 being an example of an information processing apparatus, a personal computer (PC) 302, and an AV receiver 303.

The smartphone 301, the PC 302, and the AV receiver 303 are connected to one another in a network through the wireless AP 10.

The wireless network communication system 900, for example, streaming-distributes content data (audio data) that is being played on the AV receiver 303 to the smartphone 301 and the PC 302, and performs synchronous playing on all the apparatuses. Thus, a user listens to audio that is being played on the AV receiver 303 in a living room, for example, and then moves to another room (a bedroom, for example), and is able to continuously listen to the audio by using the smartphone 301.

In the wireless network communication system 900 in FIG. 1, the AV receiver 303 serves as a server and distributes audio data to the smartphone 301 and the PC 302 being clients. However, the smartphone 301 and the PC 302 may serve as a server that distributes audio data, and the AV receiver 303 may be a client.

In this manner, in a case of distributing audio data through wireless network communication, it becomes important to grasp a communication state in a server (the AV receiver 303, for example). Therefore, in the wireless network communication system 900, a user is able to understand the communication state of a predetermined apparatus (the AV receiver 303) by using an information processing apparatus (the smartphone 301, for example) carried by the user. Hereinafter, a description is made of a configuration to grasp the communication state.

Figure 2:
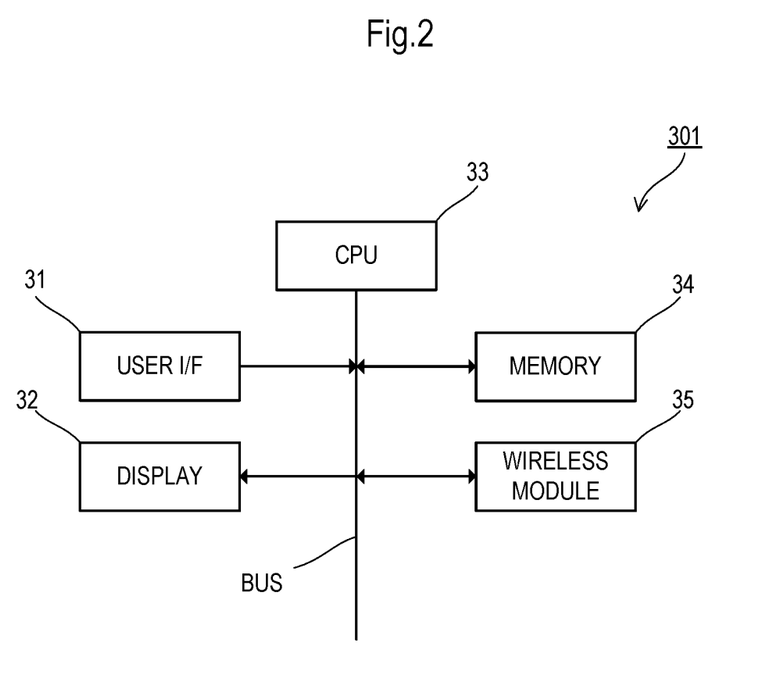
FIG. 2 is a block diagram illustrating a configuration of a smartphone.
Figure 3:
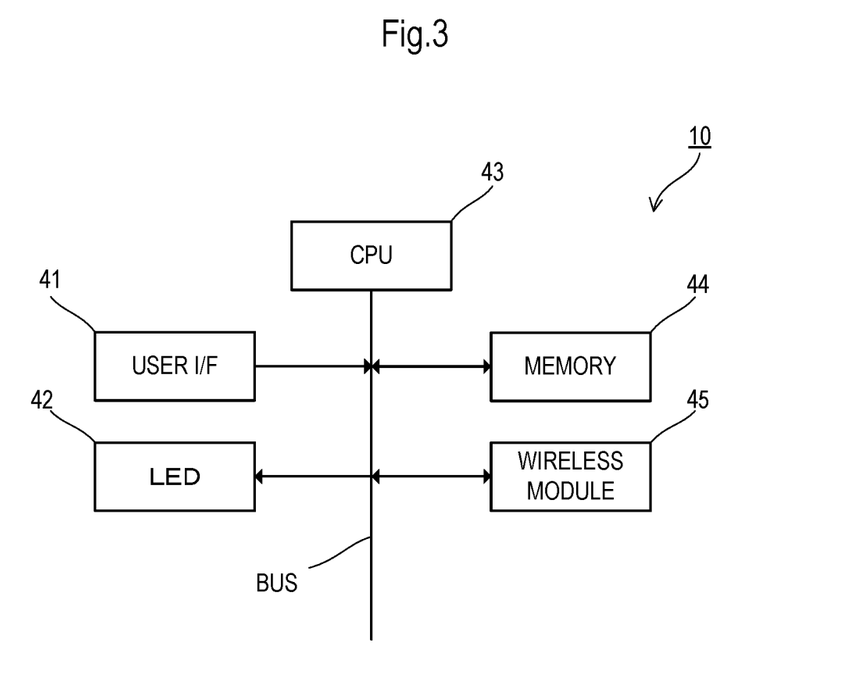
FIG. 3 is a block diagram illustrating a configuration of a relay apparatus.
Figure 4:
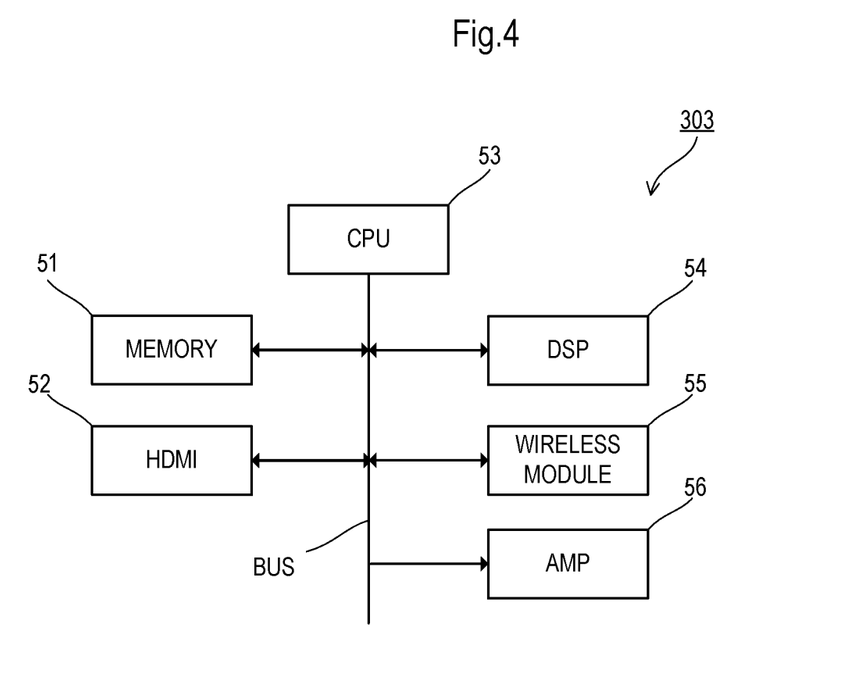
FIG. 4 is a block diagram illustrating a configuration of an AV receiver.

FIG. 2 is a block diagram illustrating a main configuration of the smartphone 301. FIG. 3 is a block diagram illustrating a main configuration of the wireless AP 10. FIG. 4 is a block diagram illustrating a main configuration of the AV receiver 303. It is to be noted that, the PC 302, while the illustration is omitted, has the same configuration as the smartphone 301 and is able to perform the same operation as the smartphone 301.

The smartphone 301 is provided with a user interface (I/F) 31, a display 32, a CPU 33, a memory 34, and a wireless module 35. Each component is connected to a common BUS.

The user I/F 31 includes a touch panel, for example, and corresponds to a receiving portion that receives an operation from a user. The display 32 presents a user a variety of information. The smartphone 301 implements a GUI (Graphical User Interface) by the user I/F 31 and the display 32.

The wireless module 35 is a wireless communicator in conformity with Wi-Fi standards, for example. The smartphone 301 is connected to the wireless AP 10 through the wireless module 35, and transmits and receives various data to and from the PC 302 or the AV receiver 303 through the wireless AP 10.

The memory 34 stores a program for operating the CPU 33. The CPU 33, by reading and executing the program stored in the memory 34, performs various processing of the smartphone 301. As a result, the CPU 33 achieves the measuring portion and the Wi-Fi strength obtaining portion. The CPU 33 transmits a predetermined command according to test data, to the AV receiver 303, for example, and performs processing of receiving a response to the predetermined command.

As illustrated in FIG. 3, the wireless AP 10 is provided with a user interface (I/F) 41, an LED 42, a CPU 43, a memory 44, and a wireless module 45.

The user I/F 41 includes a switch or the like provided in an apparatus body and receives an operation from a user. The LED 42 is a display and indicates a state (a power-on state, for example) of an own apparatus.

The wireless module 45 is a wireless communicator in conformity with Wi-Fi standards, for example. The memory 44 stores a program for operating the CPU 43. The CPU 43, by reading and executing the program stored in the memory 44, controls each component of the wireless AP 10 in an integrated manner. For example, the CPU 43 transmits the data that has been transmitted from the smartphone 301 to the AV receiver 303.

As illustrated in FIG. 4, the AV receiver 303 is provided with a memory 51, an HDMI receiver 52, a CPU 53, a DSP 54, a wireless module 55, and an amplifier (AMP) 56.

The CPU 53, by reading and executing a program stored in the memory 51, controls each component of the AV receiver 303 in an integrated manner. For example, the CPU 53 performs processing of distributing audio data as it is or as converted audio data in a predetermined encoding method, to the smartphone 301 and the PC 302 as packet data, the audio data having been input from the HDMI receiver 52.

The DSP 54 decodes audio data, converts the audio data into a digital audio signal, and performs various audio processing to the digital audio signal. However, the various processing of the DSP 54 may be performed by software of the CPU 53.

The AMP 56 is a circuit that amplifies an audio signal. The audio signal that has been amplified by the AMP 56 is converted into an analog audio signal and then is output to a not-shown speaker.

The wireless module 55 is a wireless communicator in conformity with Wi-Fi standards, for example. The AV receiver 303 is connected to the wireless AP 10 through the wireless module 55, and transmits and receives various data to and from the smartphone 301 or the PC 302 through the wireless AP 10.

Figure 5:
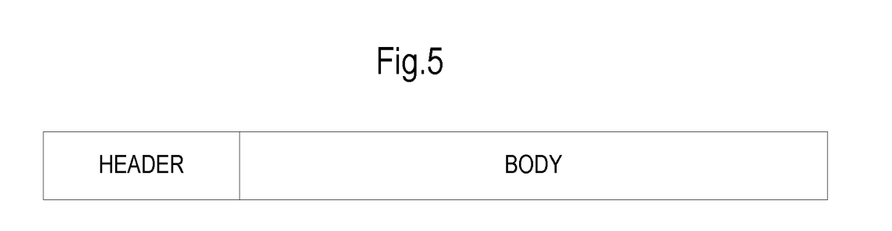
FIG. 5 illustrates a structure of test data.

FIG. 5 illustrates an example of a test data structure. As stated above, the CPU 33 of the smartphone 301 transmits test data to the AV receiver 303, and receives response data as a response to the test data. The test data as illustrated in FIG. 5 includes a header and a body.

The header includes information (information indicating whether a packet is test data or content data) that indicates the type of a packet, for example. The body includes a predetermined command for transmitting response data to test data. The CPU 53 of the AV receiver 303, by referring to a header, determines whether or not a received packet is test data. The CPU 53 of the AV receiver 303, when determining that the received packet is test data, transmits response data to the smartphone 301.

Figure 6:
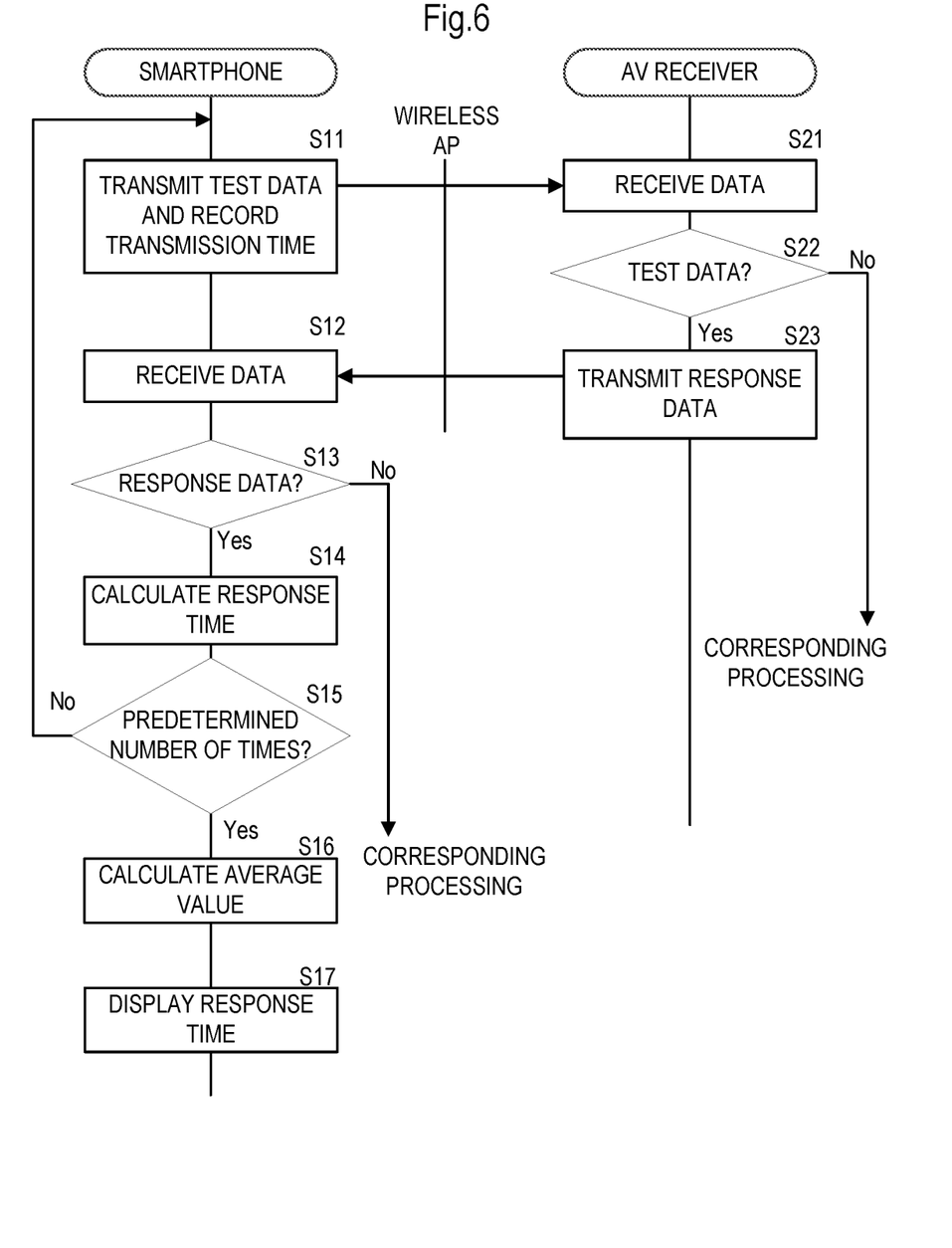
FIG. 6 is a flow chart showing an operation at a time of transmission and reception of test data.

FIG. 6 is a flow chart showing an operation of a wireless network communication system 900 at a time of transmission and reception of test data.

To begin with, the smartphone 301 transmits test data (packet data) to the AV receiver 303 through the wireless AP 10 being a relay apparatus (S11). In addition, the smartphone 301 records the transmission time of test data.

The AV receiver 303, when receiving the data from the smartphone 301 (S21), determines whether received data is test data by referring to a header (S22). The AV receiver 303, in a case in which the received data is not the test data, performs corresponding processing. In a case in which the received data is content data, for example, the AV receiver 303 buffers the content data and performs playing processing. The AV receiver 303, in a case in which the received data is the test data, creates response data to the test data and transmits the response data (S23). The response data includes Wi-Fi strength that the AV receiver 303 has detected. The detection of Wi-Fi strength is performed by the AV receiver 303 on a regular basis.

The smartphone 301, when receiving the data from the AV receiver 303 (S12), determines whether received data is the response data to the test data (S13). The smartphone 301, in a case in which the received data is not the response data, performs corresponding processing. In a case in which the received data is content data, for example, the smartphone 301 buffers the content data and performs playing processing. The smartphone 301, in the case in which the received data is the response data, calculates a response time from a difference between the transmission time of the test data recorded previously and the reception time of the response data (S14). Then, the smartphone 301 determines whether the number of times of transmission and reception of the test data reaches the predetermined number of times (S15). The transmission and reception of the test data may be performed only once, but preferably a plurality of times. In measuring a plurality of times, the smartphone 301 holds a value of each calculated response time in the memory 34.

Subsequently, the smartphone 301, in the case in which the test data is transmitted a predetermined number of times, calculates an average value of calculated response times (S16). It is to be noted that, in a case in which a user instructs reset by using the user I/F 31, the smartphone 301 calculates an average value by using next and subsequent measurement results. In addition, the smartphone 301, after calculating an average value, may compare the calculated average value and each response time and may determine that a response time out of a predetermined range (±50%, for example) is an abnormal value. In such a case, the smartphone 301 calculates an average value again by using other response times after the abnormal value is eliminated.

At the end, the smartphone 301 displays the calculated average value on the display 32 as the response time of the AV receiver 303 (S17).

Figure 7A:
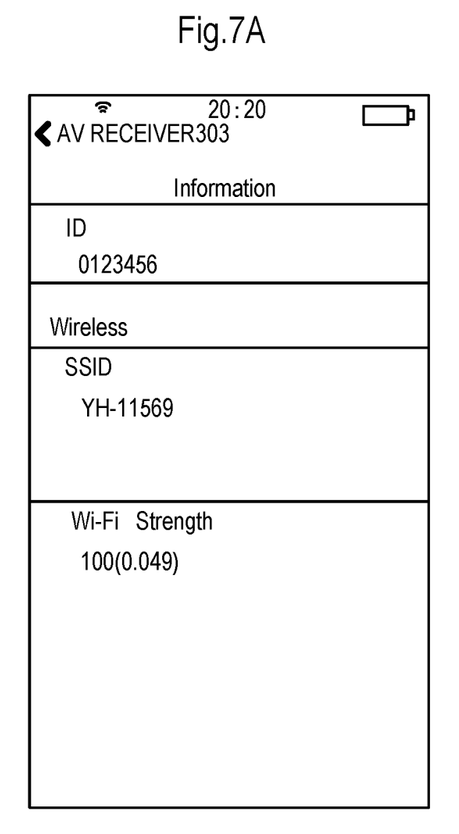
FIG. 7A and FIG. 7B illustrate a first example of a display mode of a response time.
Figure 7B:
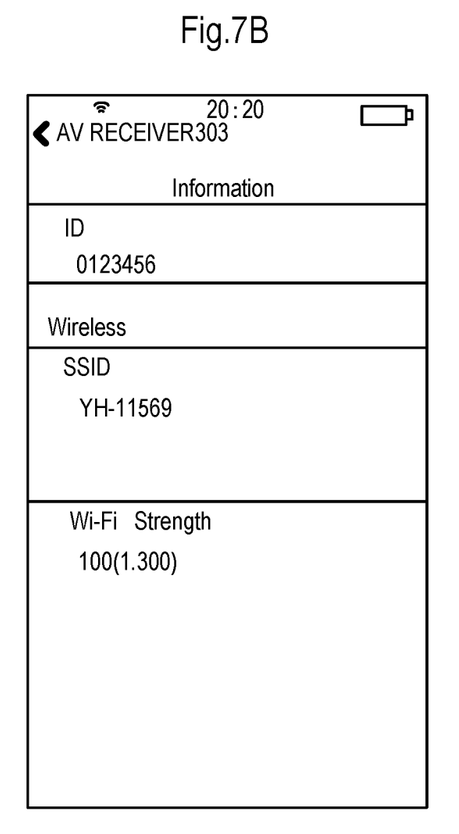

FIG. 7A and FIG. 7B illustrate a first example of a display mode of the response time on the display 32. On the display 32, as illustrated in FIG. 7A, for example, the name of the apparatus (the AV receiver 303), the identification number (ID: 0123456) of the apparatus, and an information column (Wireless) with respect to wireless communication are displayed.

In this example, Wi-Fi strength and a response time are displayed as an index of a communication state. In this example, although the actual Wi-Fi strength is −100 dBm, as the Wi-Fi strength to be displayed, only "100" is displayed as a simplified numerical value. In addition, as a response time, an actual measured value, 0.049 (sec), is displayed.

It is to be noted that the information with respect to the Wi-Fi strength may be periodically transmitted from the AV receiver 303 to the smartphone 301. Alternatively, the smartphone 301 may separately request the AV receiver 303 to transmit the information with respect to the Wi-Fi strength.

As a result, a user is able to grasp a communication state in the AV receiver 303 being the predetermined apparatus connected on the network by using the smartphone 301 carried by the user. For example, as illustrated in FIG. 7B, in a case in which the Wi-Fi strength is displayed as "100" and the response time is displayed as "1.300," the user is able to determine that a communication state is not good although the Wi-Fi strength is strong in the AV receiver 303.

It is to be noted that displaying the Wi-Fi strength is not essential. For example, in a situation in which a communication state is not good due to the presence of a noise source nearby or the presence of a large number of users, the response time becomes long. On the other hand, in a situation in which a communication state is good, the response time becomes short. In other words, the response time serves as an index that reflects an actual communication state. Therefore, the user is able to understand the communication state to some extent even only by seeing the display of the response time.

Figure 8A:
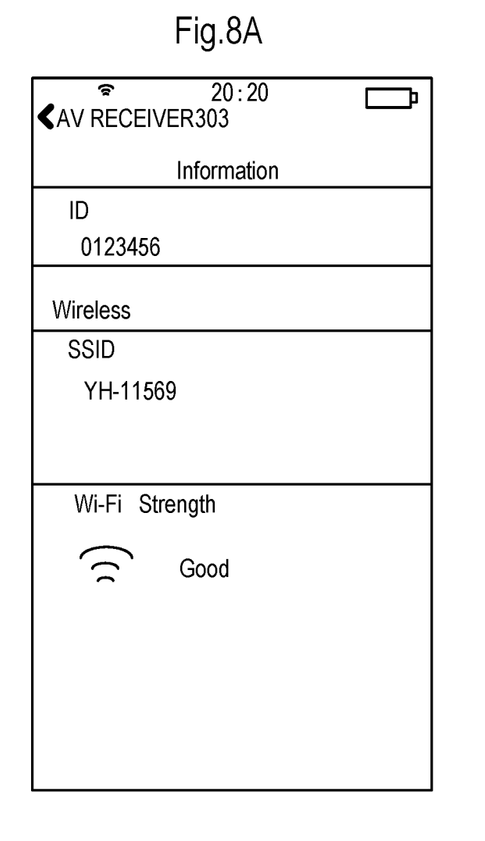
FIG. 8A and FIG. 8B illustrate a second example of a display mode of a response time.
Figure 8B:
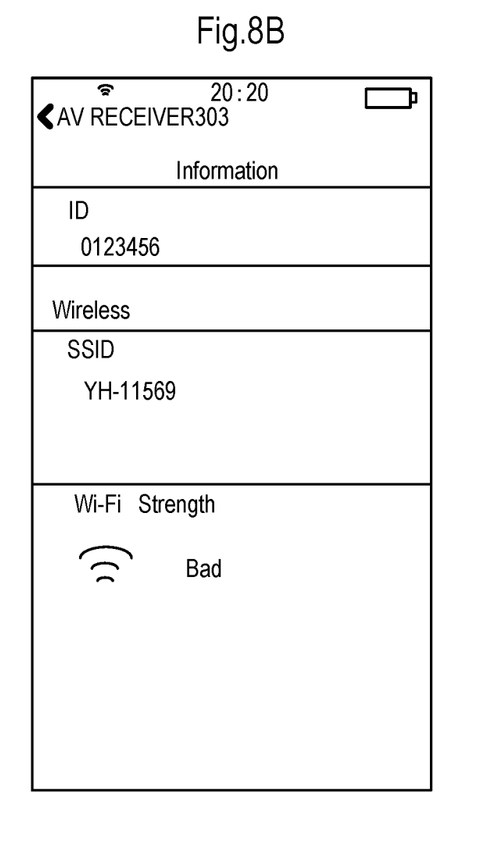

Next, FIG. 8A and FIG. 8B illustrate a second example of a display mode of the response time on the display 32. In this example, a response time is displayed as index information in a plurality of stages. For example, as illustrated in FIG. 8A, in a case in which the response time is short (in a case of less than 100 msec, for example), "Good" is displayed as index information. In addition, as illustrated in FIG. 8B, in a case in which the response time is long (in a case of not less than 1 sec, for example), "Bad" is displayed as index information. In a case in which the response time is 100 msec to 1 sec, "Normal" may be displayed.

In this example, the response time may be displayed not as an actual measured value but as index information in a plurality of stages.

Figure 9:
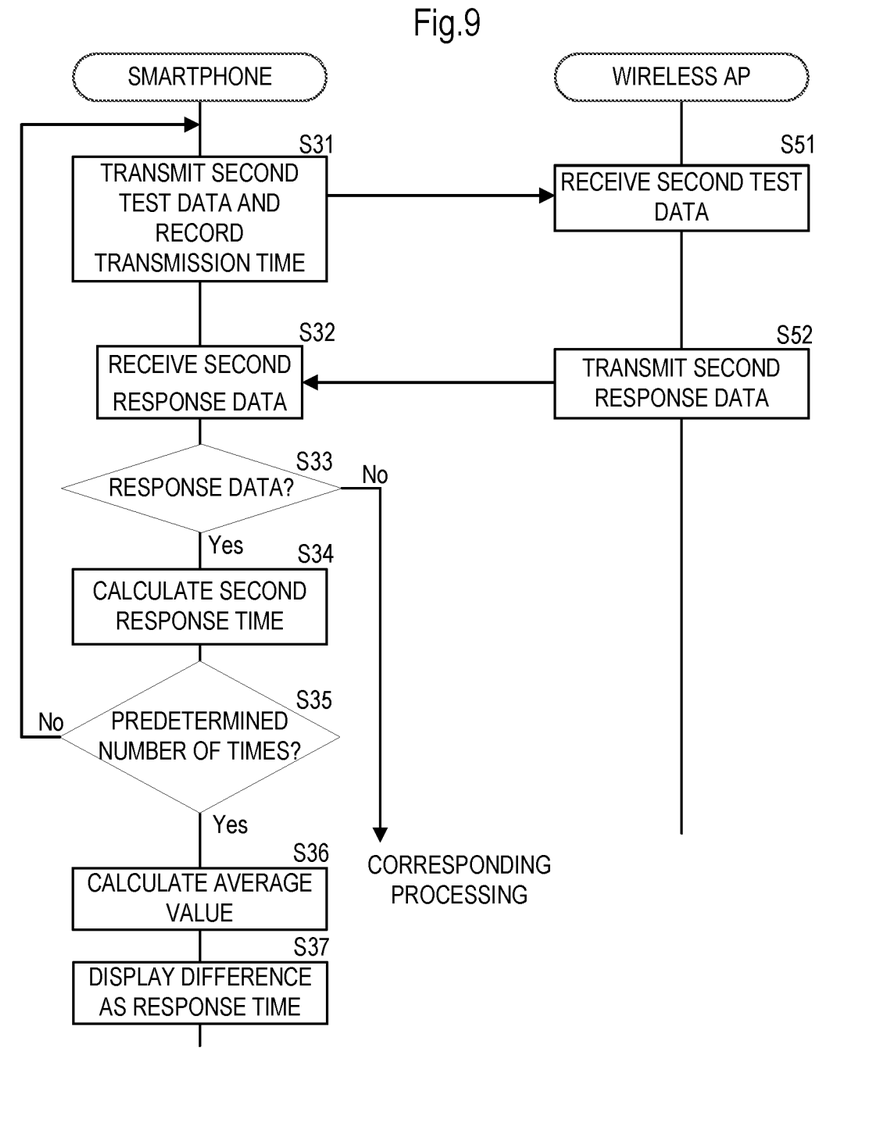
FIG. 9 is a flow chart showing an operation at a time of transmission and reception of test data according to an application example.

Subsequently, FIG. 9 is a flow chart showing an operation at a time of transmission and reception of test data. In this example, the smartphone 301 also transmits second test data that includes a second predetermined command to the wireless AP 10 in addition to the AV receiver 303, and measures a second response speed that indicates a response speed.

To begin with, the smartphone 301 transmits second test data (packet data) to the wireless AP 10 (S31). In addition, the smartphone 301 records the transmission time of test data.

The wireless AP 10, when receiving the second test data from the smartphone 301 (S51), transmits second response data to the second test data (S52).

The smartphone 301, when receiving the data from the wireless AP 10 (S32), determines whether received data is the second response data to the test data (S33). The smartphone 301, in a case in which the received data is not the second response data, performs corresponding processing. In a case in which the received data is content data, for example, the smartphone 301 buffers the content data and performs playing processing.

The smartphone 301, in the case in which the received data is the second response data, calculates a second response time from a difference between the transmission time of the second test data and the reception time of the second response data (S34). Then, the smartphone 301 determines whether the number of times of transmission and reception of the second test data reaches the predetermined number of times (S35). The transmission and reception of the second test data may also be performed only once, but preferably a plurality of times. In measuring a plurality of times, the smartphone 301 holds a value of each calculated second response time in the memory 34.

Subsequently, the smartphone 301, in a case of determining that the number of time of transmission and reception of the second test data reaches a predetermined number of times, calculates an average value of calculated second response times (S36).

At the end, the smartphone 301 obtains a difference value by subtracting the calculated average value from the response time from the AV receiver 303 and displays the difference value on the display 32 as the response time of the AV receiver 303 (S37).

The response time calculated in S15 as illustrated in FIG. 6 is influenced by the communication state between the own apparatus (the smartphone 301) and the wireless AP 10. However, in the preferred embodiment in FIG. 9, the response time displayed in S37 is obtained by subtracting the second response time from the wireless AP 10, so that only the communication state between a predetermined apparatus (the AV receiver 303) on the network excluding the influence of the own apparatus and the access point 10 is appropriately indicated.

Further, as another preferred embodiment, the smartphone 301, if grasping the configuration of the network (a connection state) (or basing on grasping information), transmits the test data to both a predetermined apparatus on a network on which a communication state is displayed and a predetermined apparatus located upstream by one from the predetermined apparatus. The smartphone 301 receives the response data from each of the predetermined apparatuses and measures the response time from the two predetermined apparatuses. The smartphone 301, by calculating a difference of the response time from the two predetermined apparatuses, measures and indicates the communication state of the predetermined apparatus alone on the network.

It is to be noted that the foregoing preferred embodiments are illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

The wireless communication relay apparatus such as the wireless AP 10 or a wireless LAN router is able to perform the same operation as the smartphone 301. For example, the wireless AP 10 may transmit a predetermined command to other apparatuses in the network and may measure the response time. In such a case, the wireless AP 10 may be provided with a display displaying a response time or may transmit the response time to the smartphone 301 or the like, for example. The apparatus such as the smartphone 301 or the like that has received a response time displays the response time.

Further, the wireless AP 10 may transmit a second predetermined command to the smartphone 301 and may measure the response speed (the second response speed). In such a case, the wireless AP 10 obtains a response time by subtracting the second response speed from the response time and transmits an obtained response time to the smartphone 301 or the like. The apparatus such as the smartphone 301 or the like that has received a response time displays the response time.

In addition, the wireless AP 10, in a case of obtaining information with respect to Wi-Fi strength, may be provided with a display displaying the information with respect to the Wi-Fi strength or may transmit the information with respect to the Wi-Fi strength to the smartphone 301 or the like, together with the response time. The apparatus such as the smartphone 301 or the like displays the information with respect to the Wi-Fi strength.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An information processing apparatus, comprising:
    a wireless communicator that performs wireless communication;
    at least one processor configured to implement stored instructions and execute a measure task that transmits a predetermined command to a predetermined apparatus through the wireless communicator and measures a response time; and
    a display that displays the response time, wherein the response time is calculated from a difference between a transmission time of the predetermined command and a reception time of a response data for the predetermined command.

2. The information processing apparatus according to claim 1, wherein:
    the measure task further transmits a second predetermined command to a relay apparatus and measures a second response speed that indicates a response speed; and
    the display displays a response time obtained by subtracting the second response speed.

3. The information processing apparatus according to claim 1, wherein:
    the at least one processor is further configured to execute a Wi-Fi strength obtaining task that obtains information with respect to Wi-Fi strength of the predetermined apparatus; and
    the display displays the information with respect to the Wi-Fi strength, together with the response time.

4. The information processing apparatus according to claim 1, wherein the measure task, as the response time, calculates an average value of a plurality measurement times.

5. The information processing apparatus according to claim 4, further comprising:
    a receiving portion, that receives an operation of a user, wherein the measure task, when receiving a reset instruction from the user, calculates the average value by using next and subsequent measurement results.

6. The information processing apparatus according to claim 1, wherein the response time is displayed as index information in a plurality of stages.

7. A wireless network communication system, comprising:
    the information processing apparatus according to claim 1; and
    the predetermined apparatus, said predetermined apparatus being a server distributing audio data.

8. The wireless network communication system according to claim 7, further comprising:
    a client that receives distribution of the audio data from the predetermined apparatus, wherein the wireless network communication system performs synchronous play with the server and the client.

9. A wireless communication relay apparatus, comprising:
    a wireless communicator that performs wireless communication;

at least one processor configured to implement stored instructions and execute a plurality of tasks, wherein the plurality of tasks include:

a measure task that transmits a predetermined command to a predetermined apparatus through the wireless communicator and measures a response time; and a transmitting task that transmits the response time, wherein the response time is calculated from a difference between a transmission time of the predetermined command and a reception time of a response data for the predetermined command.

10. The wireless communication relay apparatus according to claim 9, wherein:

the measure task further transmits a second predetermined command to a relay apparatus and measures a second response speed that indicates a response speed; and the transmitting task transmits a response time obtained by subtracting the second response speed.

11. The wireless communication relay apparatus according to claim 9, wherein:

the at least one processor is further configured to execute a Wi-Fi strength obtaining task that obtains information with respect to Wi-Fi strength of the predetermined apparatus; and the transmitting task transmits the information with respect to the Wi-Fi strength, together with the response time.

12. The wireless communication relay apparatus according to claim 9, wherein the measure task, as the response time, calculates an average value of a plurality of measurement times.

13. The wireless communication relay apparatus according to claim 12, further comprising:

a receiving portion that receives an operation of a user, wherein the measure task, when receiving a reset instruction from the user, calculates the average value by using next and subsequent measurement results.

14. The wireless communication relay apparatus according to claim 9, wherein the response time is transmitted as index information in a plurality of stages.

15. An information processing method of executing processing, comprising:

transmitting a predetermined command to a predetermined apparatus through a wireless communicator and measuring a response time; and displaying the response time, wherein the response time is calculated from a difference between a transmission time of the predetermined command and a reception time of a response data for the predetermined command.

16. The information processing method according to claim 15, further comprising:

transmitting a second predetermined command to a relay apparatus and measuring a second response speed that indicates a response speed; and displaying a response time obtained by subtracting the second response speed.

17. The information processing method according to claim 15, further comprising:

obtaining information with respect to Wi-Fi strength of the predetermined apparatus; and displaying information with respect to the Wi-Fi strength, together with the response time.

18. The information processing method according to claim 15, further comprising:

as the response time, calculating an average value of a plurality of measurement times.

19. The information processing method according to claim 18, further comprising:

receiving an operation of a user; and calculating the average value by using next and subsequent measurement results, when receiving a reset instruction from the user.

20. The information processing method according to claim 15, wherein the response time is displayed as index information in a plurality of stages.

* * * * *